US008659550B2

(12) United States Patent
Lai et al.

(10) Patent No.: US 8,659,550 B2
(45) Date of Patent: Feb. 25, 2014

(54) COMPUTER INPUT APPARATUS HAVING A FAULT DETECTION CIRCUIT FOR DETECTING CURRENT FLOWING THROUGH A LIGHT SOURCE

(75) Inventors: Sheng-Yeh Lai, Hsinchu (TW); Ming-Hui Kuo, Taipei (TW)

(73) Assignee: PixArt Imaging Inc., Hsinchu (TW)

( * ) Notice: Subject to any disclaimer, the term of this patent is extended or adjusted under 35 U.S.C. 154(b) by 0 days.

(21) Appl. No.: 13/472,627

(22) Filed: May 16, 2012

(65) Prior Publication Data
US 2012/0223887 A1 Sep. 6, 2012

Related U.S. Application Data

(62) Division of application No. 11/353,308, filed on Feb. 14, 2006, now Pat. No. 8,212,775.

(60) Provisional application No. 60/655,644, filed on Feb. 22, 2005.

(51) Int. Cl.
G06F 3/033 (2013.01)
G09G 5/08 (2006.01)

(52) U.S. Cl.
USPC .......................................................... 345/166

(58) Field of Classification Search
USPC .......................................................... 345/166
See application file for complete search history.

(56) References Cited

U.S. PATENT DOCUMENTS

| 6,172,354 B1 * | 1/2001 | Adan et al. ..................... 250/221 |
| 6,246,482 B1 | 6/2001 | Kinrot et al. |
| 6,256,016 B1 | 7/2001 | Piot et al. |
| 6,704,183 B2 | 3/2004 | Stafford |
| 2002/0141125 A1 * | 10/2002 | Stafford ....................... 361/93.7 |
| 2004/0160998 A1 | 8/2004 | Gruhlke et al. |
| 2004/0227954 A1 | 11/2004 | Xie |
| 2005/0180473 A1 | 8/2005 | Brosnan |
| 2005/0195868 A1 * | 9/2005 | Moran et al. ................. 372/38.1 |

* cited by examiner

Primary Examiner — Long D Pham
(74) Attorney, Agent, or Firm — Tung & Associates

(57) ABSTRACT

A computer input apparatus is disclosed which has improved safety control. Computer input devices with coherent light sources are popular. However, coherent light sources may cause serious and unrecoverable injuries to human eyes. Accordingly, there are several safety specifications defined by manufacturers and governments. Therefore, an improved device is disclosed that includes a calibration circuit and a fault detection circuit to control the operation current of a coherent light source to be within the safety specifications range, and to monitor for fault conditions. Furthermore, a computer input apparatus with coherent light source can be operated without the traditional optical lens.

10 Claims, 4 Drawing Sheets

COMPUTER INPUT APPARATUS HAVING A FAULT DETECTION CIRCUIT FOR DETECTING CURRENT FLOWING THROUGH A LIGHT SOURCE

CROSS REFERENCE TO RELATED APPLICATIONS

Priority is claimed to U.S. Provisional Application No. 60/655,644, the disclosure of which is hereby incorporated herein by reference.

This is a Divisional of application Ser. No. 11/353,308, filed on Feb. 14, 2006 now U.S. Pat. No. 8,212,775.

FIELD OF THE INVENTION

The present invention generally relates to a computer input apparatus, and, in particular, certain embodiments of the invention relate to an optical mouse using a coherent light source and having a safety mechanism.

BACKGROUND OF THE INVENTION

In personal computers, computer mice are popular means for inputting data and providing cursor control. A conventional mechanical mouse generally employs a rolling ball and at least two encoder wheels for x- and y-axis input operation. The respective encoder wheels are rotated by the rolling ball when a user moves the mouse along a flat surface, such as a mouse pad. The encoder wheels will intermittently block certain light propagation in the mouse and associated electronic signals are generated to control cursor movement on a computer display. However, the performance of the mechanical mouse may degrade through extended use due to ball abrasion and dust. Moreover, the mechanical mouse uses a bulky and heavy steel ball, which is also inconvenient for the user.

To overcome such drawbacks, optical mice were developed that comprise a light source such as a light emitting diode (LED), a light receiver such as a photo diode and associated components. The conventional optical mouse is operated on a patterned surface for modulating a light emitted from the light source. The modulated light is received by the light receiver to identify mouse movement and control cursor motion.

However, the above-mentioned optical mouse required a specialized mouse pad for normal operation, which limited the applicability thereof. Due to advancement of complementary metal oxide semiconductor (CMOS) image sensors and digital signal processing, a CMOS sensor array can be used in the optical mouse to overcome the above problem. The optical mouse may be operated on a non-transparent flat surface and the detected signals of the CMOS sensor array are analyzed to identify mouse movement and control cursor motion.

For optical mice using a non-coherent light source, such as an LED, the micro-texture of a working surface is discriminated for controlling cursor movement. For optical mice using a coherent light source, such as a laser diode, a complex diffraction pattern, called a speckle pattern, is exploited for controlling cursor movement even when the optical mouse is placed on a mirror like working surface.

U.S. Pat. No. 6,256,016 to Piot et al., entitled "Optical detection system, device, and method utilizing optical matching," discloses an optical mouse with a coherent light source and uses an artificially limited anisotropic aperture to enhance optical resolution. U.S. Pat. No. 6,246,482 to Kinrot et al., entitled "Optical translation measurement," discloses an optical mouse with a coherent light source and uses a reference beam produced by a grating to enhance optical resolution. US Patent publication 20040227954 to Xie, entitled "Interferometer based navigation device," discloses an optical mouse with a coherent light source and uses an interferogram to obtain phase information and to enhance optical resolution. All of the disclosures of these patents and publications are hereby incorporated by reference. However, in above-mentioned prior art optical mice, complicated optical elements are required and the cost of the optical mouse is increased.

US Patent publication 20040160998 of Gruhlke et al., entitled "Method and apparatus for modifying the spread of a laser beam," mentions that optical mice containing laser devices are potentially hazardous to the eye. This safety issue is considered by International Standards for The Safety of Laser Products (ISSLP). Class 1 laser devices are defined as being safe under reasonably foreseeable—although perhaps not recommended—conditions of use, such as the use of optical instruments such as a magnifying lens for intra-beam viewing. The disclosure of these publications are hereby incorporated by reference.

US Patent publication 20040160998 also mentioned that, according to the ISSLP, the maximum-allowed power, i.e., the acceptable emission light (AEL) level, for a commonly used single-mode 850 nanometer (nm) wavelength Class 1 laser device is 0.78 milliwatts (mW) when measured according to the ISSLP-defined standard. The defined standard is the amount of flux (power per unit area) through a 7 millimeter (mm) aperture in a radial plane that is 14 mm from the point where the laser beam exits the device. Thus, if the flux of the laser beam that passes through the 7 mm aperture is less than 0.78 mW, then the laser device is considered Class 1 safe.

US Patent publication 20040160998 further discloses an optical mouse with a coherent light source and uses an optical train to modify laser beam spread. The laser beam is advantageously spread to prevent a dangerous laser beam with excessive intensity passing through an aperture of the optical mouse to help ensure safety. However, this patent publication employs several complicated optical elements to dilute the light intensity of the laser beam or divert the direction of the optical paths. For example, the patent utilized an optical train element including a focusing lens, a diffractive focusing vortex lens, a beam splitting device or a two dimensional diffraction grating whose cost is expensive.

U.S. Pat. No. 6,704,183 to Stafford et al., entitled "Fault detection in an LED bias circuit," discloses a bias circuit for preventing excessive emission from light emitting diodes. The disclosure of this patent is hereby incorporated by reference. This disclosure employs two resistors, at least two current legs and several comparators for detecting current passing through an LED; however, the two current legs may consume a lot of power from the LED and thus deteriorate the performance of the LED.

US Patent publication 20050180473 to Brosnan, entitled "Open loop laser power control in optical navigation," mentions a current output of a drive signal, modulated between two current settings, being applied to a laser diode. This disclosure describes controlling the power consumption of the laser diode by a toggling signal. The disclosure of this patent is hereby incorporated by reference. However, this disclosure requires a complex analog modulator or digital analog converter (DAC) to control the current flowing through the laser diode. Moreover, a plurality of current settings is necessary for this disclosure.

The above-mentioned disclosures provide at least one lens to diminish the emitting power of laser beams which are dangerous to humans' eyes.

By utilizing a coherent light source, an optical mouse, without the lens, can be realized. Certain embodiments of the invention provide a control means to restrict excessive power under stable and safe conditions. A preferred embodiment of the present invention also provides a computer mouse without optical lenses.

SUMMARY OF THE INVENTION

One aspect of the present invention is to provide an optical mouse using a coherent light source and having an inexpensive safety mechanism.

According to one aspect of the present invention, an optical mouse comprises a control circuit to control the optical power from a coherent light source to keep the optical power below a power limit value for eye safety.

According to another aspect of the present invention, the control circuit comprises a fault detection circuit (e.g., a current sensing circuit) to disconnect the current supplied to the coherent light source when the optical power is excessive and dangerous for human eyes.

According to another aspect of the invention, a computer input apparatus comprises a housing; a circuit board supported by a housing; a sensor chip arranged on the circuit board; a control circuit; wherein a light source projects light on a working surface and the sensor chip captures reflected images from the working surface in a time scale. In order to operate the computer input apparatus without the traditional lens which not only focuses the light beams but also reduces the danger of the unintentional emitting laser beams to human eyes, a calibration circuit is integrated into the control circuit for restricting the power of the emitting laser beams to be under a safety value and over the threshold value for normal operations. Moreover, to avoid damage caused by the laser beams from the computer input apparatus, a fault detection circuit is integrated in the control circuit too. The current flowing through the light source is monitored by the fault detection circuit. Should the current flowing through the light source exceed the safety value, the flowing path of the current is broken immediately.

BRIEF DESCRIPTION OF THE DRAWINGS

Various objects and advantages of the present invention will be more readily understood from the following detailed description when read in conjunction with the appended drawing, in which.

DESCRIPTION OF EMBODIMENTS OF THE INVENTION

Figure 1:
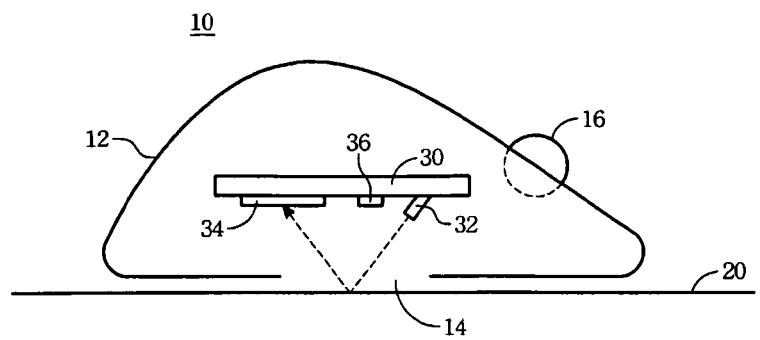
FIG. 1 shows a sectional view of an optical mouse according to a preferred embodiment of the present invention.

FIG. 1 shows a sectional view of an optical mouse 10 according to a preferred embodiment of the present invention.

The optical mouse 10, which is placed on a working surface 20, comprises a housing 12, a circuit board 30 placed within the housing 12, a light source 32 arranged on the circuit board 30 and having a predetermined inclined angle with respect to the working surface 20, a sensor chip 34 arranged on the circuit board 30 and a control circuit 36 arranged on the circuit board 30. The predetermined inclined angle between the beam and the normal vector of the working surface 20 is, for example, about 47.5 degrees. However, other inclined angles can be used as long as the desired optical resolution is achieved. Moreover, the optical mouse 10 optionally comprises an aperture 14 defined on a bottom portion of the housing 12 and a third-axis wheel 16 arranged on a top face of the housing 12.

In another respect of the preferred embodiment, the optical mouse 10 placed on a working surface 20 comprises a housing 12 upholding a navigation device comprising a circuit board 30, a light source 32 and a sensor chip 30 detecting the reflected optical image from the working surface 20 which was projected by the light source 32. The housing 12 may contain an aperture 14 between the light source 32 and the working surface 20 or the housing 12 may be made of transparent material in the portion between the light source 32 and the working surface 20. Moreover, a computer mouse 10 usually contains a control portion including two or three buttons, a roller ball or a rolling wheel. In a computer mouse utilizing a non-coherent light source, the light source 32 is an LED diode. In a computer mouse utilizing a coherent light source, the light source 32 may be a laser device, e.g., a Vertical Cavity Surface Emitting Laser (VCSEL). To detect images, the sensor chip 34 may employ a CMOS image sensor or a CCD (Coupling Charge diode) sensor. The sensor chip 34 of the navigation device continues to capture images reflected from the working surface 20 in a time scale as the computer mouse 10 is moved by hand along a specific path indicating the position of the pointer on a computer screen. Normally, the captured images are further processed by an external control circuit 36 positioned on the circuit board 30, e.g., a printed circuit board, on which there are the sensor chip 34, the control circuit 36 and the light source 32. With the advanced improvement of the CMOS image sensors, the control circuit 36 can be integrated into the sensor chip 34 to save cost and enhance the computation ability of the tracking algorithm.

Figure 3:
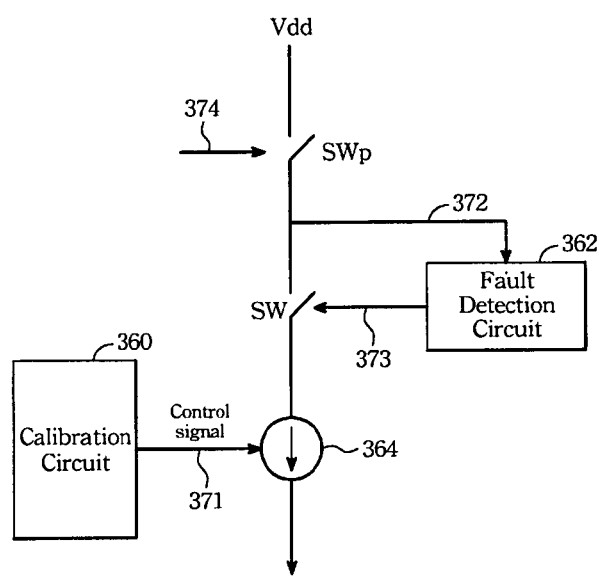
FIG. 3 shows a block diagram of a control circuit according to a preferred embodiment of the present invention.

FIG. 3 shows a block diagram of the control circuit 36 according to a preferred embodiment of the present invention. The control circuit 36 comprises a calibration circuit 360 for providing a control signal 371 to a current source 364 and a fault detection circuit 362 for sensing the current provided by the current source 364 and detecting fault conditions of the light source 32. When the current provided to the light source 32 exceeds a predetermined threshold value, the fault detection circuit 362 will detect the excessive current from the detection path 372 and disconnect the current flow path between the light source 32 and the current source 364 by the control signal 373. Herein, the symbol SW between the light source 32 and the current source 364 illustrates that no current will flow through the light source 32, which is necessary to emit light no matter the light source 32 employs an LED diode or a VCSEL diode, when SW is in the illustrated open condition. If the current source 364 is provided by a transistor mirroring current from other transistors, the current of the light source 32 can be halted by stopping the mirror operation of the current. In other words, the switch symbol SW here is for illustrating the operations of the emitting mechanism and control means of the light source 32. Many variations and modifications can be made without departing from the scope of the invention. For example, the symbol SW can be realized by stopping mirror operation as mentioned above. The symbol SW can also be implemented by a switch implemented by a transistor. Moreover, a transmission gate can be used to implement the symbol SW. In one embodiment of the invention, there is another switch SWp interposed between the power Vdd and the light source 32. It is possible that the signal 372 was shorted to a ground during the assembly process and causes a short current from the power Vdd to the ground through the light source 32, i.e. LED diode. Therefore, an additional switch between the power Vdd and the light source 32 can assure that the computer input apparatus will be protected while it is used or during the manufacturing process. A control signal 374 is used to keep the switch SWp open until a safe environment for operations of the computer input apparatus is provided. The implement of the switch can be, e.g., a transistor (an NMOS transistor or a PMOS transistor), or a poly fuse. Furthermore, the control signal 374 can be a signal from a power on circuit (not shown) or a voltage detect circuit (not shown). The control signal 374 can be a signal from a timer circuit (not shown), too.

Figure 2:
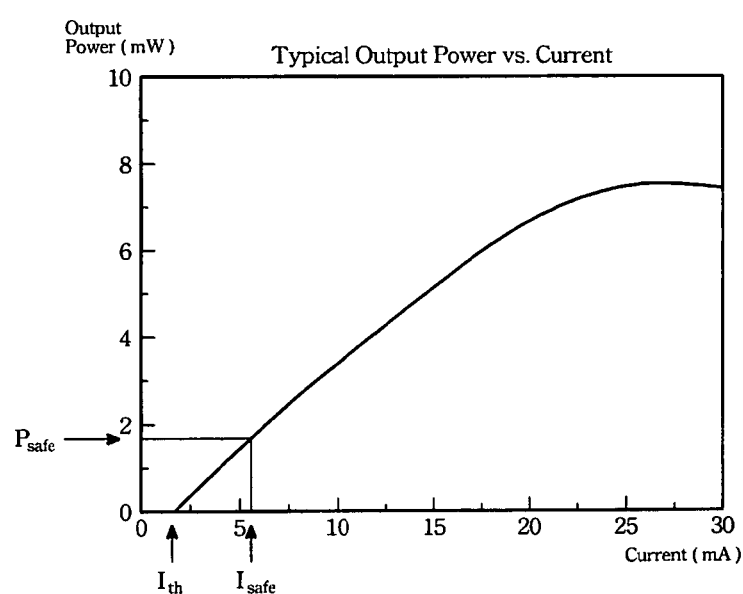
FIG. 2 shows a relationship between driving current and output light power for a light source.

FIG. 2 shows a relationship between driving current and output light power for a light source 32, which is a coherent light source such as a laser diode in the preferred embodiment of the present invention. The control circuit 36 serves to maintain the optical power of the light source 32 under a power limit value Psafe for eye safety. More particularly, the calibration circuit 360 will limit the driving current between a threshold current Ith and a safety limit current Isafe, which is the current corresponding to the Psafe. When the laser diode 32 is operated below the threshold current Ith, the laser diode 32 will not lase and the light generated is a non-coherent light. When the driving current exceeds the threshold current Ith, the laser diode 32 begins to lase and the light generated is a coherent light. Therefore, speckle pattern is exploited for controlling cursor movement. If the driving current exceeds the safety limit current Isafe, the emitted optical power also exceeds the power limit value Psafe and is potentially hazardous to human eyes. As shown in this figure, provided that the power limit value Psafe for eye safety is 1.5 mW, the safety limit current Isafe is about 6 mA. Therefore, the calibration circuit 360 will limit the driving current between the threshold current Ith (about 2 mA) and the safety limit current Isafe (about 6 mA); and the fault detection circuit 362 will disconnect the path between the light source 32 and the current source 364 once the current flowing through the light source 32 exceeds the safety limit current Isafe. This will be described in detail later. The safety limit current Isafe may be variably depending upon specific eye safety criterion and laser specification. Therefore, the above example is only demonstrative. For example, if the power limit value Psafe for eye safety is 0.74 mW for class 1 standard, the safety limit current Isafe is about 3 mA for the laser characteristic shown in this figure. Other values can be used for other laser characteristics.

Figure 4:
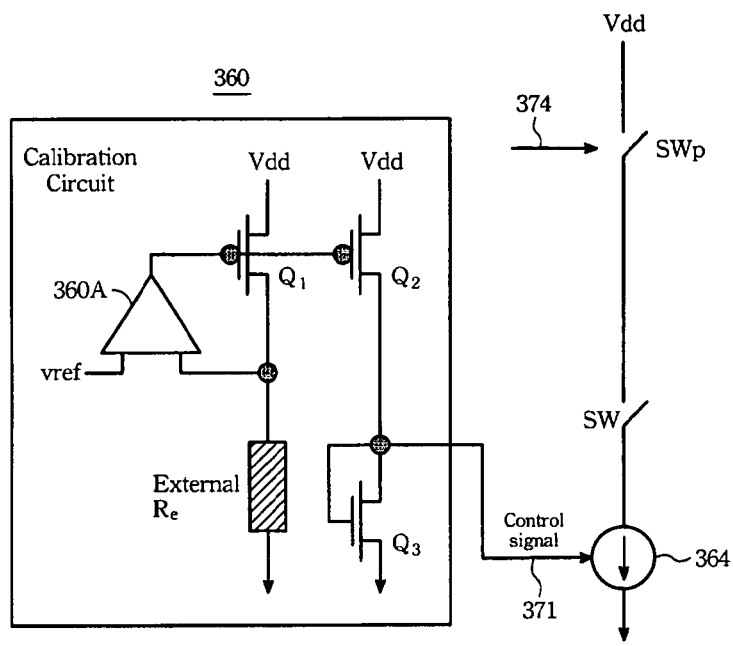
FIG. 4 shows a circuit diagram of a calibration circuit according to a preferred embodiment of the present invention.

FIG. 4 shows a detailed circuit diagram of the calibration circuit 360 according to an embodiment of the present invention. The calibration circuit 360 comprises a first amplifier 360A with a first input connected to a reference voltage Vref and a second input connected to an external resistor Re, a first transistor Q1 connected to the output of the first amplifier 360A and the second input of the first amplifier 360A, a second transistor Q2 with the gate thereof connected to the gate of the first transistor Q1 and a third transistor Q3, which functions as an active load of the second transistor Q2. When the reference voltage Vref is applied to the first input of the first amplifier 360A, a corresponding control signal 371 is generated at the drain of the third transistor Q3, and controls the current source 364 to supply a driving current Id in the range between the threshold current Ith and the safety limit current Isafe.

In one respect of the preferred embodiment of the invention, the first amplifier 360A, the external resistor Re and the first transistor Q1 form a circuit configuration of a simple regulator regulating the current flowing through the first transistor Q1. With natural calibration properties of the first amplifier 360A, the two inputs thereof are kept at the same voltage level such that the second input of the first amplifier 360A has the same voltage as the voltage level, i.e. the reference voltage Vref, of the first input of the first amplifier 360A. Therefore, the voltage level on the second input of the first amplifier 360A is fixed. By choosing an appropriate external resistor Re according to the safety standard specifications of the coherent light source 32, the safe operation current can be determined and controlled. The safe current is determined by Vref/Re. When the voltage on the second input of the amplifier 360A is too low, the first amplifier 360A increases the output voltage (if the transistor Q1 is an NMOS transistor), or decreases the output voltage (if the transistor Q1 is a PMOS transistor). The transistor Q1 and transistor Q2 are PMOS transistors in the detailed illustrations. After the reference current, which is the current flowing through the transistor Q1, is determined and is within the safe operating range, the transistor Q2 can be used to steer the reference current into the transistor Q3. Generally, the transistor Q2 can share part of the burden required by the above-mentioned circuit configuration of the regulator. The transistor Q2 can increase the reference current produced by the above-mentioned regulator so as to overcome the restriction of the device dimension of the transistor Q1. The current consumption specification can be met and the tolerance requirement for resistor Re can be relaxed.

The transistor Q3 acts as current mirror for current source 364 through the control signal 371, if the current source 364 uses NMOS transistors to pull down current from the light source 32. In order to reduce the cost, the transistor Q2 and transistor Q3 can be removed by using the second input of the first amplifier 360A as the control signal 371, provided that an appropriate bias voltage is given to the current source 364, e.g., by modifying the voltage of Vref or providing a suitable current mirror biased at a voltage level equal to the voltage Vref. Although, the burden to generate the necessary current will fall on the regulator itself as mentioned above.

Another example for removing the transistor Q2 and transistor Q3 without departing the scope and spirit of the invention will now be described. The layout positions of the external resistor Re and the transistor are exchanged, and the original PMOS transistor Q1 is replaced with an NMOS transistor such that the resistor Re is connected to the power supply and the NMOS transistor is connected to the resistor Re and the ground. Furthermore, the output of the amplifier 360A is connected to a gate of the transistor, and the second input of the amplifier 360A is connected to a drain terminal of the NMOS transistor. With the latter circuit configuration, it is easier to adapt the calibration circuit of the invention to a computer input apparatus.

As mentioned above, a lot of variations and modifications on circuit configurations can be easily adjusted according to the invention. Therefore, those embodiments illustrated above are for descriptions only. Any change altering the connection of the calibration circuit without departing from the appended claims is still within the scope of the invention.

In one embodiment of the invention, there is an additional switch SWp and a control signal 374 used to protect the light source 32 from excess current or voltage irrespective of whether the occurrence of the excess current or voltage is sudden or continues for a relatively long time.

Figure 5:
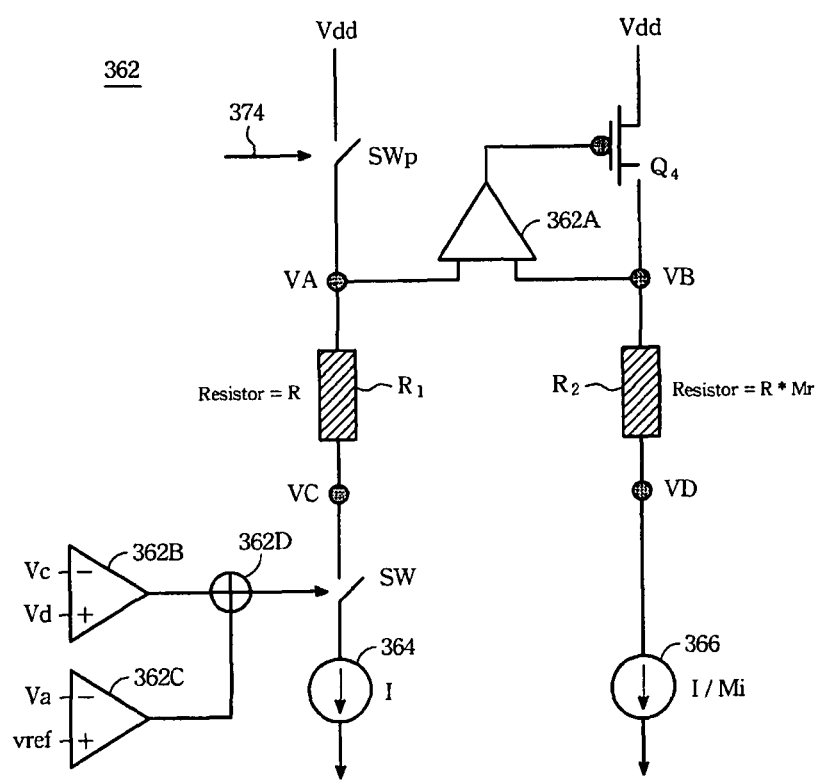
FIG. 5 shows a circuit diagram of a fault detection circuit according to a preferred embodiment of the present invention.

FIG. 5 shows a detailed circuit diagram of the fault detection circuit 362 according to an embodiment of the present invention. The fault detection circuit 362 comprises a second amplifier 362A, wherein the first input end thereof is connected to the current source 364 through the first resistor R1 with resistance R and the second input end thereof is connected to a comparison current source 366 through a second resistor R2 with resistance (R*Mr), where Mr is a predetermined value. The first input end of the second amplifier 362A is further connected to the cathode of the laser diode 32. Herein, the symbol SW between the light source 32 and the current source 364 illustrates that in the illustrative "open" configuration no current will flow through the light source 32 which is necessary to emit light no matter whether the light source 32 employs an LED diode or a VCSEL diode. If the current source 364 is provided by a transistor mirroring current from other transistors, the current flow of the light source 32 can be halted by stopping the mirror operation of the current. In other words, the switch symbol SW here is for illustrating the operations of the emitting mechanism and control means of the light source 32.

The current source 364 supplies a driving current Id for the laser diode 32 and an auxiliary current source 366 supplies an auxiliary current Id/Mi, where Mi is a predetermined value. The fault detection circuit 362 further comprises a fourth transistor Q4 connected between the output end of the second amplifier 362A and the second input end of the second amplifier 362A. The fault detection circuit 362 further comprises a first comparator 362B, a second comparator 362C, and a digital unit 362D. The negative terminal of the first comparator 362B is connected to the node Vc, which has a voltage VA−R*Id; the positive terminal of the first comparator 362B is connected to the node Vd, which has a voltage VB−R*Id* (Mr/Mi). The virtual ground of the second amplifier 362A will force the voltage VA at node Va to be equal to the voltage VB at node Vb. The parameters Mr and Mi are selected such that the voltage VC at node Vc is slightly larger than the voltage VD at node Vd under normal conditions. Therefore, the output of the first comparator 362B is LOW under normal conditions. Once the current Id provided by the current source 364 increases to exceed the safety limit current Isafe, the voltage VC at node Vc will decrease and the output of the first comparator 362B is HIGH. The digital unit 362D is, for example, an OR gate and will trigger the switch SW to disconnect the node Vc from the current source 364 when excessive driving current occurs.

The negative terminal of the second comparator 362C is connected to the node Va, which is the cathode of the laser diode 32, and the positive terminal of second comparator 362C is connected to the reference voltage Vref. Under normal conditions, the voltage VA at the node Va is larger than the reference voltage Vref and the output of the second comparator 362C is LOW. If the cathode of the laser diode 32 is shorted to ground, the output of the second comparator 362C will be HIGH. In other words, the digital unit 362D will trigger the switch SW to disconnect the node Vc from the current source 364. Through the above arrangement, the fault detection circuit 362 can disconnect the current supplied to the laser diode 32 should fault conditions, such as excessive driving current or unintentional grounding, occur. However, the fault detection circuit 362 can be adapted to detect other faults and take additional measures, as appreciated by those skilled in the art, to terminate such a fault.

In FIG. 5, as mentioned above, in one embodiment of the invention, there is an additional switch SWp and a control signal 374 used to protect the light source 32 from excess current or voltage, irrespective of whether the occurrence of the excess current or voltage is sudden or continues for a relatively long time.

In the above-described optical mouse 10, the control circuit 36 could also be integrated with the light source 32 or the sensor chip 34 to reduce product cost.

Moreover, the above-described optical mouse 10 could be equipped with a wireless transceiver to provide wireless operation. The optical mouse 10 could also be equipped with an optical elements such as lens, grating, hologram and interferogram to enhance optical function. The optical mouse 10 could also be equipped with a rolling ball or a protective cover on the location of the aperture 14 to protect internal circuits in the mouse, which are encompassed in the scope of the present invention.

In summary, according to certain embodiments of the present invention, an optical mouse uses a simplified optical element and electronic circuits to keep the optical power of the coherent light source to be below a power limit value safe for human eyes.

It is to be understood that these embodiments are not meant as limitations of the invention, but merely exemplary descriptions of the invention with regard to certain specific embodiments. Indeed, different adaptations may be apparent to those skilled in the art without departing from the scope of the annexed claims. For instance, the current source of the light source can be replaced by a pull-up device coupled and positioned between the power and the light source.

What is claimed is:

1. A computer input apparatus, comprising:
a light source to project light on a working surface;
a sensor chip to capture reflected images from said working surface; and
a control circuit having a fault detection circuit to control power provided to said light source,
wherein said fault detection circuit comprises:
a first current source to provide a current flowing through said light source;
a first resistor having a first terminal coupled to said first current source and a second terminal coupled to said light source;
an amplifier having a first input connected to one terminal of said light source, a second input and an output;
a transistor having a gate connected to said output of said amplifier and one terminal connected to said second input of said amplifier, wherein said transistor is not connected between said first input of said amplifier and said light source, and is not connected between said second input of said amplifier and said light source;
a second resistor having two terminals, a first terminal being connected to said second input of said amplifier, wherein said second input of said amplifier is connected between said first terminal of said second resistor and any other part of said amplifier; and
a second current source coupled with said second terminal of said second resistor to provide a current such that a voltage level of said second terminal of said second resistor is similar to a voltage level of said second terminal of said first resistor,
wherein said current flowing through said light source is controlled in accordance with a comparison between said voltage level of said second terminal of said second resistor and said voltage level of said second terminal of said first resistor.

2. The computer input apparatus according to claim 1, further comprising:
a switch interposed between a power supply and said light source.

3. The computer input apparatus according to claim 1, wherein said control circuit is integrated with said sensor chip.

4. The computer input apparatus according to claim 1, wherein said fault detection circuit produces a control signal to reduce a current flowing through said light source when it detects an excessive current flowing through said light source.

5. The computer input apparatus according to claim 1, wherein the fault detection circuit provides a control signal to stop a current flowing through said light source when it detects an excessive current flowing through said light source.

6. The computer input apparatus according to claim 1, wherein current flowing through said light source is in a specific range between a threshold current and a safety current of said light source.

7. The computer input apparatus according to claim 1, wherein said resistance of said second resistor is a multiple of said resistance of said first resistor, and said current provided by said first current source is a multiple of said current provided by said second current source.

8. The computer input apparatus according to claim 1, further comprising:
a comparator to compare said voltage level of said second terminal of said second resistor and said voltage level of said second terminal of said first resistor.

9. The computer input apparatus according to claim 1, further comprising:
a comparator to compare said voltage level of said first terminal of said first resistor and a reference voltage.

10. The computer input apparatus according to claim 1, further comprising:
a digital unit;
a first comparator to compare said voltage level of said second terminal of said second resistor and said voltage level of said second terminal of said first resistor; and
a second comparator to compare said voltage level of said first terminal of said first resistor and a reference voltage;
wherein said digital unit receives the comparison results from said first comparator and said second comparator and further controls said first current source to reduce excessive current flowing through said light source.

* * * * *